United States Patent [19]

Lazareva et al.

[11] 3,835,190

[45] Sept. 10, 1974

[54] CHEMICAL COMPOUND, N, N'-DIBENZYLETHYLENEDIAMINODIMETHYLTETRACYCLINE

[76] Inventors: Elena Nikolaevna Lazareva, Nakhimovsky prospect, 1, korp. 1, kv. 72; Olga Petrovna Belozerova, Prospekt Mira, 124, korp. 15, kv. 72; Tamara Ivanovna Efimova, 1 Nikolo- Schepovsky per., 6, kv. 10; Ljudmila Vladimirovna Sitnikova, Ul. Tekhachevskogo, 32, kv. 48; Alexandra Pavlovna Krjuchkova, Avtomotornaya ul., 4, kv. 42, all of Moscow, U.S.S.R.

[22] Filed: Oct. 31, 1968

[21] Appl. No.: 772,410

[52] U.S. Cl. .................... 260/559, 424/227
[51] Int. Cl. ............................ C07c 103/19
[58] Field of Search .................... 260/559 AT

[56] References Cited

UNITED STATES PATENTS

| | | | |
|---|---|---|---|
| 3,218,335 | 11/1965 | Scevola | 260/559 |
| 3,247,250 | 4/1966 | Tamorria | 260/559 |
| 3,272,817 | 9/1966 | Gordon et al. | 260/559 |
| 3,388,161 | 6/1968 | Lancini et al. | 260/559 |

*Primary Examiner*—Alex Mazel
*Assistant Examiner*—Anne Marie T. Tighe
*Attorney, Agent, or Firm*—Waters, Roditi, Schwartz & Nissen

[57] ABSTRACT

A compound, N, N'-dibenzylethylenediaminodimethylditetracycline is prepared by reacting tetracycline base with formaldehyde and N, N'-dibenzylethylenediamine with heating in an organic solvent. The instant compound is the active ingredient for a medical preparation used in the treatment of trachoma, infectious conjunctivities and other infectious eye diseases.

1 Claim, No Drawings

CHEMICAL COMPOUND, N,N'-DIBENZYLETHYLENEDIAMINODIMETHYL-TETRACYCLINE

This invention relates to the chemical compound N-H'-dibenzylethylenediaminodimethylditetracycline

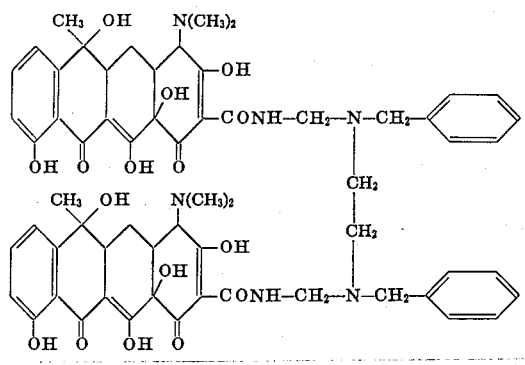

The above chemical compound is new and is the active ingredient for a medical preparation used in the treatment of trachoma, infectious conjunctivitis and other infectious eye diseases. It is also used in veterinary practice for the treatment of infectious diseases of animals and fowl, for example, necrobacillosis in northern deer and pasteurel losis in ducks.

The above chemical compound N,N'-dibenzylethylenedia-minodimethylditetracycline is obtained, in the following way.

Tetracycline base is reacted with formaldehyde and N,N'-dibenzylethylenediamine by heating in an organic solvent medium. Preferably isobutyl alcohol or tert-butyl alcohol is used as the organic solvent.

The reaction is carried out preferably at a temperature of 74° – 78°C.

The molor ratio of the reagents, tetracycline base, formaldehyde and N,N'-dibenzylethylenediamine, is preferably 2:2:1, respectively.

The preferred way of using the medicinal preparation is in the form of an ointment the base of which consists of a mixture of vaseline and lanolin.

In order that those skilled in the art may better understand the present invention, the following examples of producing the new chemical compound N,N'-dibenzylethylenediaminodimethylditetracycline are given by way of illustration.

EXAMPLE 1

To a 1-l three-necked flask, equipped with a mechanical stirrer, a reflux condenser and a thermometer there are added 600 ml of isobutyl alcohol and 65.18 g of tetracycline base the activity of which is 830$\mu$ mg/mg. (0.112 mole). The mixture is stirred for 15 minutes and then there are added with stirring 176 ml of a solution of N,N'-dibenzylethylenediamine in isobutyl alcohol the concentration of which is 0.077 g/ml, i.e., 13.52 g. of N,N'-dibenzylethylenediamine (0.056 mole) and 8.4 g of a 40 percent solution of formaldehyde in water (0.112 mole).

The reaction mixture is stirred for 10 minutes, heated on a water bath to 74° – 78°C and maintained at this temperature for 15 minutes. Then the hot reaction mixture is filtered through a filter paper, the filtrate is cooled to a temperature of 5° – 7°C and kept at this temperature for a period of 6 hours.

The reaction mixture is then again filtered on a Buchner funnel through a filter paper on which there is placed a sheet of silk. The pressed filter cake is washed twice with 30 – 35 ml portions of isobutyl alcohol.

Drying of the product is carried out in a vacuum oven at a pressure of 10 mm Hg and a temperature of 30°C.

The yield of the desired product is 45.85 g. The activity of the compound is 708$\mu$ mg/mg calculated as tetracycline hydrochloride.

EXAMPLE 2

To a 1.5-l three-necked flask, equipped with a mechanical stirrer, a reflux condenser and a thermometer there is added 1 liter of tert-butyl alcohol and 100 g of tetracycline base the activity of which is 880$\mu$ mg/mg (0.183 mole). The mixture is stirred for 15 minutes and then there are added with stirring 22.27 g (0.0915 mole) of N,N'-dibenzylethylenediamine base and 13.73 g of a 40 percent solution of formaldehyde in water (0.183 mole).

The reaction mixture is stirred for 10 minutes, heated on a water bath to 74° – 78°C and maintained at this temperature for 15 minutes. Then the hot reaction mixture is filtered through a filter paper. The filtrate is cooled to 5° – 7°C and kept at this temperature for 6 hours. The reaction mixture is then again filtered on a Buchner funnel through a filter paper on which there is placed sheet of silk. The pressed filter cake is washed twice with 50 ml portions of tert-butyl alcohol.

Drying of the product is carried out in a vacuum oven at a pressure of 10 mm Hg at 30°C.

The yield of the desired product is 75.86 g. The activity of this compound is 696$\mu$ mg/mg calculated as tetracycline hydrochloride.

N,N'-dibenzylethylenediaminodimethylditetracycline is an amorphous yellowish-brown powder which is sparingly soluble in water, ethyl alcohol and ether. The pH of an aqueous solution of the end product is 5.5 – 7.0.

The medicinal preparation is used in the form of an ointment having a vaseline-lanolin base. One gram of the ointment contains 10,000$\mu$ mg of the compound calculated as tetracycline hydrochloride.

The preparation has a prolonged activity on the organism.

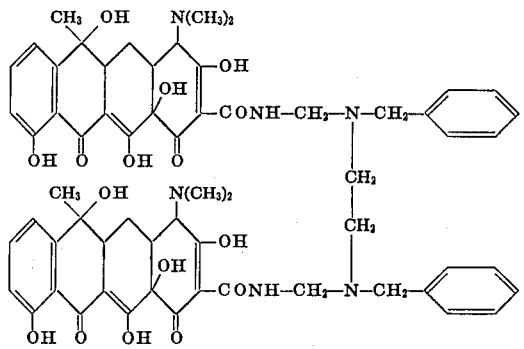

What is claimed is:

1. A chemical compound, N,N'-dibenzylethylenediaminodimethyltetracycline having the following formula